(12) United States Patent
Chen et al.

(10) Patent No.: US 10,401,603 B2
(45) Date of Patent: Sep. 3, 2019

(54) HIGH-SPEED BINARY LASER BEAM SHAPING AND SCANNING

(71) Applicant: The Chinese University of Hong Kong, Hong Kong (CN)

(72) Inventors: Shih-Chi Chen, Hong Kong (CN); Jiyi Cheng, Hong Kong (CN); Chenglin Gu, Hong Kong (CN); Dapeng Zhang, Hong Kong (CN)

(73) Assignee: THE CHINESE UNIVERSITY OF HONG KONG, Hong Kong (CN)

( * ) Notice: Subject to any disclaimer, the term of this patent is extended or adjusted under 35 U.S.C. 154(b) by 199 days.

(21) Appl. No.: 14/860,461

(22) Filed: Sep. 21, 2015

(65) Prior Publication Data

US 2017/0082845 A1    Mar. 23, 2017

(51) Int. Cl.
| | |
|---|---|
| *H04N 7/18* | (2006.01) |
| *G02B 21/00* | (2006.01) |
| *G02B 27/30* | (2006.01) |
| *G02B 27/00* | (2006.01) |
| *G02B 26/08* | (2006.01) |
| *G02B 27/09* | (2006.01) |

(52) U.S. Cl.
CPC ..... *G02B 21/0048* (2013.01); *G02B 21/0032* (2013.01); *G02B 21/0072* (2013.01); *G02B 26/0833* (2013.01); *G02B 27/0037* (2013.01); *G02B 27/0933* (2013.01); *G02B 27/30* (2013.01)

(58) Field of Classification Search
CPC .......................... G02B 21/0048; G02B 27/0037
USPC .......................................................... 348/135
See application file for complete search history.

(56) References Cited

U.S. PATENT DOCUMENTS

| | | | | |
|---|---|---|---|---|
| 2009/0238217 | A1* | 9/2009 | Moser | ..................... H01S 5/141 372/20 |
| 2012/0069344 | A1* | 3/2012 | Liu | .......................... G01B 9/04 356/450 |
| 2016/0199935 | A1* | 7/2016 | Chen | ................... G02B 26/0833 219/121.61 |
| 2016/0274539 | A1* | 9/2016 | Smithwick | ........... G03H 1/2645 |

OTHER PUBLICATIONS

K. Dholakia, et al.; "Shaping the future of manipulation" Nature Photonics, vol. 5, Jun. 2011; pp. 335-342.

(Continued)

*Primary Examiner* — Richard T Torrente
(74) *Attorney, Agent, or Firm* — Knobbe, Martens, Olson & Bear, LLP (57) ABSTRACT

A device and method are for shaping and scanning an ultrafast laser beam. The device includes a laser source configured to output a pulsed laser beam containing different frequency spectrum, a digital micromirror device (DMD) consisting of micromirrors, which are configured to receive the laser beam and shape the received laser beam with computer generated holograms, and a dispersion compensation unit, arranged before or after the DMD, which is configured to transfer the laser beam from the laser source to the DMD with a designated angular dispersion for neutralizing the first angular dispersion introduced by the DMD.

11 Claims, 3 Drawing Sheets
(3 of 3 Drawing Sheet(s) Filed in Color)

(56) References Cited

OTHER PUBLICATIONS

Shu Jia, et al.; "Isotropic three-dimensional super-resolution imaging with a self-bending point spread function" Nature Photonics | vol. 8 | Apr. 2014, pp. 302-306.

Planchon, et al.; "Rapid three-dimensional isotropic imaging of living cells using Bessel beam plane illumination" Nature Methods | vol. 8 No. 5 | May 2011 | pp. 417-426.

Fernández-Suárez, et al.; "Fluorescent probes for super-resolution imaging in living cells" Nature Reviews | Molecular Cell Biology; vol. 9, Dec. 2008, pp. 929-943.

Vaughan, et al.; "New fluorescent probes for super-resolution imaging" Nature Biotechnology, vol. 29, No. 10, Oct. 2011, pp. 880-881.

R. Kodama, et al.; "Fast heating of ultrahigh-density plasma as a step towards laser fusion ignition" Nature, vol. 412, Aug. 23, 2001, pp. 798-802.

McLeod, et al.; "Subwavelength direct-write nanopatterning using optically trapped microspheres" Nature Nanotechnology, vol. 3, Jul. 2008, pp. 413-417.

Hahn, et al.; "Real-time digital holographic beam-shaping system with a genetic feedback tuning loop" Applied Optics, vol. 45, No. 5, Feb. 10, 2006, pp. 915-924.

Bahk, et al.; "A high-resolution, adaptive beam-shaping system for high-power lasers" Optics Express, vol. 18, No. 9, Apr. 26, 2010, pp. 9151-9163.

Fatemi, et al.; "Generation of hollow beams by using a binary spatial light modulator" Optics Letters, vol. 31, No. 7, Apr. 1, 2006, pp. 864-866.

Chattrapiban, et al.; "Generation of nondiffracting Bessel beams by use of a spatial light modulator" Optics Letters, vol. 28, No. 22, Nov. 15, 2003, pp. 2183-2185.

Bagnoud, et al.; "Independent phase and amplitude control of a laser beam by use of a single-phase-only spatial light modulator" Optics Letters, vol. 29, No. 3, Feb. 1, 2004, pp. 295-297.

M. Reicherter, et al.; "Optical particle trapping with computer-generated holograms written on a liquid-crystal display" Optics Letters, vol. 24, No. 9, May 1, 1999; pp. 608-610.

H. Kück, et al.; "Deformable micromirror devices as phase-modulating high-resolution light valves" Sensors and Actuators A 54, (1996) pp. 536-541.

Nemoto, et al.; "Optimum control of the laser beam intensity profile with a deformable mirror" Applied Optics, vol. 36, No. 30, Oct. 20, 1997; pp. 7689-7695.

Gong, et al.; "Observation of the asymmetric Bessel beams with arbitrary orientation using a digital micromirror device" Optics Express, vol. 22, No. 22, Nov. 3, 2014; pp. 26763-26776.

Lerner, et al.; "Shaping Laguerre-Gaussian laser modes with binary gratings using a digital micromirror device" Optics Letters, vol. 37, No. 23, Dec. 1, 2012; pp. 4826-4828.

Dufour, et al.; "Two-photon excitation fluorescence microscopy with a high depth of field using an axicon" Applied Optics, vol. 45, No. 36, Dec. 20, 2006; pp. 9246-9252.

A. Piskarskas, et al.; "Noncollinear second-harmonic generation in periodically poled KTiOPO4 excited by the Bessel beam" Optics Letters, Vo. 24, No. 15, Aug. 1, 1999; pp. 1053-1055.

Polynkin, et al.; "Curved Plasma Channel Generation Using Ultraintense Airy Beams" Science vol. 324, Apr. 10, 2009; pp. 229-232.

Gattass, et al.; "Femtosecond laser micromachining in transparent materials" Nature Photonics, vol. 2, Apr. 2008; pp. 219-225.

Chong, et al.; "Airy-Bessel wave packets as versatile linear light bullets" Nature Photonics, vol. 4, Feb. 2010; pp. 103-106.

Akturk, et al.; "Pulse-front tilt caused by spatial and temporal chirp" Optics Express, vol. 12, No. 19, Sep. 20, 2004; pp. 4399-4410.

Wai-Hon Lee; "Binary Synthetic Holograms" Applied Optics, vol. 13, No. 7, Jul. 1974; pp. 1677-1682.

Bryngdahl, et al.; "Laser beam scanning using computer-generated holograms" Applied Optics, vol. 15, No. 1, Jan. 1976; pp. 183-194.

Reddy, et al.; "Three-dimensional random access multiphoton microscopy for functional imaging of neuronal activity" Nature Neuroscience, vol. 11, No. 6, Jun. 2008; pp. 713-720.

\* cited by examiner

HIGH-SPEED BINARY LASER BEAM SHAPING AND SCANNING

TECHNICAL FIELD

The present disclosure relates to laser beam shaping and scanning, in particular, to high-speed laser beam shaping and scanning.

BACKGROUND

Laser beam shaping, i.e., modulation of the phase, mode and amplitude of a laser beam, is an important technology that enables many practical laser applications. Specific laser beam modes, such as Airy beam, Bessel beam and Laguerre-Gaussian (LG) beam, enable critical applications in optical manipulation, biomedical imaging, laser fusion and material processing etc. Accordingly, various beam shaping techniques have been proposed and developed. The most effective and common laser beam shaper is designed with a spatial light modulator (SLM). For example, a liquid crystal (LC)-based SLM achieves arbitrary beam shaping with good efficiency and resolution for both continuous-wave (CW) and pulsed lasers. Alternatively, beam shapers can be designed with a deformable mirror (DM) device, which can generate arbitrary phase or amplitude profiles. Although the aforementioned methods are effective and commercially available, they are limited by the shaping rate and resolution, i.e., the LC-SLM can only operate at 100 s Hz and a typical DM device has less than 10,000 pixels.

A digital micromirror device (DMD) can be considered as a programmable binary mask, consisting of several million micromirrors. Each micromirror is an independent pixel with two stable angular positions, i.e., ±12°. Recently, the DMD has been reported to shape continuous wave (CW) lasers. The DMD is a promising device for next-generation laser beam shapers for the following reasons: (1) broad wavelength range, i.e., from ultraviolet (~320 nm) to far infrared (2500 nm) with appropriate coatings; (2) high pattern rate, up to 32.5 kHz; (3) high damage threshold; and (4) insensitivity to polarization. Despite these advantages, applications of DMD in beam shaping methods have been limited to CW lasers to date due to the complexity involved in compensating the dispersion in pulsed lasers.

As ultrafast lasers such as femtosecond lasers are essential to a myriad of scientific and industrial applications, e.g., two-photon excited (TPE) microscopy, second-harmonic generation, laser filamentation, micro machining and light bullet generation, new high-speed and high resolution femtosecond beam shaping technologies may facilitate a multitude of new scientific studies and applications. The extension of DMD technologies to ultrafast lasers can thus advance the performance limit of conventional beam shaping methods.

SUMMARY OF THE INVENTION

The present disclosure provides a device for shaping and scanning an ultrafast laser beam with higher shaping and scanning rate and resolution.

According to an aspect of the present application, a device for shaping an ultrafast laser beam comprises: a laser source, configured to output a pulsed laser beam containing different frequency spectrum; a digital micromirror device (DMD) consisting of a plurality of micromirrors, configured to receive the laser beam and shape the received laser beam with a first angular dispersion; and a dispersion compensation unit, arranged before or after the DMD, configured to transfer the laser beam from the laser source to the DMD with a second angular dispersion for neutralizing the first angular dispersion.

According to an embodiment, the dispersion compensation unit may comprise at least one diffraction component, configured to receive the laser beam from the laser source and transfer the received laser beam into a beam with the second angular dispersion; and a lens pair, configured to collimate and expand the pulsed laser beam and image the beam onto the DMD.

According to an embodiment, the dispersion compensation unit may further comprise a mirror, configured to change the sign of angular dispersion of the beam imaged to the DMD.

According to an embodiment, the diffraction component is a component that disperses light, such as a grating, a prism, a hologram and another DMD.

According to an embodiment, the device may further comprise an imaging unit, configured to record beam modes obtained from the output beam of the DMD.

According to an embodiment, the imaging unit may comprise a filter, configured to filter the output beam from the DMD; and a CCD camera, configured to record the image or beam modes obtained from the filtered beam.

According to an embodiment, the plurality of micromirrors of the DMD are programmable to generate variable patterns to shape beams into arbitrary profiles.

According to an embodiment, the dispersion compensation unit is arranged so that the second angular dispersion is positive if the first angular dispersion is negative and the second angular dispersion is negative if the first angular dispersion is positive.

According to another aspect of the present application, a laser scanning microscope comprising the above device is provided. According to embodiments, the device may be used for controlling the beam modes, x- and y-scanning and z-scanning, the microscope may be a wide field or line-scanning microscope based on pulsed lasers or a super-resolution microscope based on pulsed lasers. A laser fabrication/machining system comprising the device is also provided.

BRIEF DESCRIPTION OF THE DRAWINGS

The patent application file contains at least one drawing executed in color. Copies of this patent application publication with color drawing(s) will be provided by the Office upon request and payment of the necessary fee.

FIG. 7b illustrates Intensity variation of pulses in Airy mode when zooming in on the red dashed region located in FIG. 7a; and FIG. 7c illustrates intensity variation of pulses in LG mode when zooming in on the blue dashed region located in FIG. 7a.

DETAILED DESCRIPTION OF THE PREFERRED EMBODIMENTS

This invention presents a new method that generates dynamic binary masks via a digital micromirror device (DMD) to manipulate and correct the wavefront of a pulsed laser, i.e. a DMD-based Ultrafast Beam Shaper (DUBS). Pulsed lasers are widely used in biomedical imaging, fiber optics, spectroscopy, manufacturing, lithography and high-field physics etc. Beam shaping is a process that shapes the distribution of the amplitude and phase of electromagnetic waves, namely, the wavefront of a beam. Beam shaping has extensive applications comprising laser scanning microscopy, endomicroscopy, material processing, optical communication, 3D printing and frontier physics-chemical research. In addition, applications in optical tweezer and super-resolution also require the beam profile to be shaped like a "doughnut". Comparing with existing beam shaping technologies, our new DMD-based beam shaper has the following advantages: (1) broad band ranging from ultraviolet (UV) to far infrared when coated appropriately, (2) high pattern rate up to 32 kHz, (3) high damage threshold, (4) insensitivity to polarization, and (5) low cost. This new technology provides precision control for ultrahigh speed wavefront manipulation of pulsed laser beams and thus enables diverse high-speed applications that cannot be done before.

Figure 1:
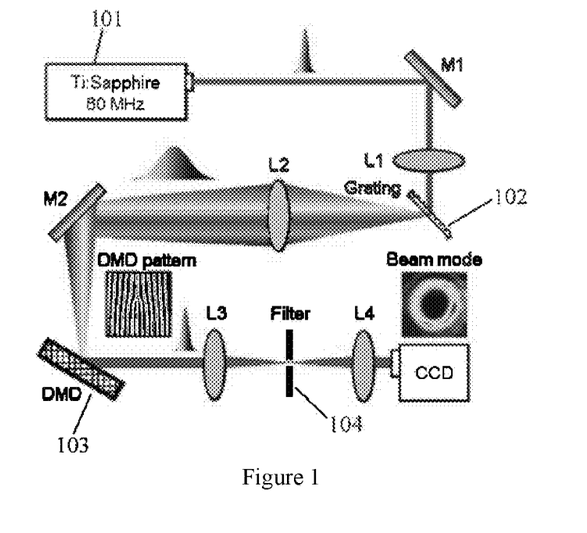
FIG. 1 is an illustrative optical configuration of a device according to an embodiment of the disclosure.

The optical configuration of DUBS is presented in FIG. 1. The system consists of four parts: a laser source, a dispersion compensation unit, a beam shaping device, and a detection/imaging unit. The laser source may be is a Ti:Sapphire femtosecond second laser 101 (e.g. Chameleon Ultra II, Coherent, USA; repetition rate: 80 MHz; average power: 3.5 W). As understood, the laser source may be any other suitable source outputting a pulsed laser beam containing different frequency spectrum. For example, the laser is operated at a central wavelength of 797 nm with a pulse width of 200 fs and a beam diameter of ~1 mm. The beam shaping device is a digital micromirror device (DMD) 103 consisting of a plurality of micromirrors, configured to receive the laser beam and shape the received laser beam with a first angular dispersion (e.g. 1140×912 pixels, DLP4500-NIR, Texas Instrument, USA). The dispersion compensation unit is arranged before or after the DMD and configured to transfer the laser beam from the laser source to the DMD with a second angular dispersion for neutralizing the first angular dispersion. The dispersion compensation unit consists of two achromatic lenses L1, L2 (e.g. A=50 mm and $f_2$=100 mm) and a dispersion compensation unit such as a blazed grating 102 (1200 lines/mm, Lightsmyth, USA). The diffraction component unit may also be a component that disperses light, such as a prism, a hologram or another DMD. L1 and L2 together form a beam expander. In addition, L2 itself images the beam onto the DMD. The values of f1 and f2 can change but L1 and L2 should form a 4-f system. An optional mirror M2 may also be included in the diffraction component unit when required for reversing the sign of the angular dispersion directed to the DMD. The detection/imaging unit may be comprised of a pair of achromatic lens L3, L4 (e.g. $f_s$=5 mm and $f_4$=75 mm), a filter 104 and a CCD camera (e.g. Chameleon CMLN-13S2M, Coherent, USA). L3 and L4 can adjust the output beam size (if f3 is not equal to f4) and image the output to the camera. When the grating 102 is illuminated by the laser beam, it disperses the spectrum at the −1st order and simultaneously broadens the pulse width. Consequently, a positive angular dispersion is added to the input beam. As the DMD 103 simultaneously functions as a programmable binary mask and a blazed reflection grating, it will introduce negative angular dispersion to the output beam. Based on the fact, L2 is properly positioned between the grating 102 and the DMD 103 so that the two dispersions are neutralized. As a result, the output beam is dispersion-free. The filter 104 is placed at the back focal plane of L3 to spatially filter out all diffracted beams except the −1st order beam of the hologram pattern as the output beam. Accordingly, arbitrary beam shaping can be achieved by altering the patterns on the DMD 103 without dispersion. The patterns on the DMD 103 are calculated based on the principle binary holography. An optional mirror M1 is also used in the embodiment of FIG. 1 for making the configuration more compact.

Hereinafter, features related to the DUBS will be described in details.

Dispersion Compensation

As mentioned above, as the DMD simultaneously functions as a programmable binary mask and a blazed reflection grating, it may introduce negative angular dispersion to the output beam. To address this issue, a blazed transmission grating (1200 lines/mm, Lightsmyth, USA) is placed before L2, combined with a high-reflectivity mirror M2, to generate positive dispersion for eliminating the dispersion in the DUBS. After the DMD, two achromatic lenses, L3 and L4 ($f_{L3}$=75 mm and $f_{L4}$=75 mm), project the output beam to a CCD camera (Chameleon CMLN-13S2M, Coherent, USA) for monitoring the beam modes. An iris diaphragm is placed at the back focal plane of L3 to spatially filter out all diffracted beams except the −1st order beam of the hologram pattern as the output beam. Accordingly, arbitrary beam shaping can be achieved by altering the patterns on the DMD without dispersion. The patterns on the DMD are calculated based on the principle binary holography.

It is understood that, although we take the first angular dispersion introduced by the DMD being negative and the second angular dispersion introduced by the grating being positive as an example. It is also possible that the first angular dispersion introduced by the DMD is positive and the second angular dispersion introduced by the grating is negative as required.

Angular dispersion compensation is critical to shaping pulsed laser beams. The key dispersion parameters can be determined by the following analysis. We begin with the grating equation:

$$d(\sin\theta_i + \sin\theta_m) = m\lambda, \quad (1)$$

where d is the grating period; m is an integer indicating the diffraction order; $\theta_i$ and $\theta_m$ are the incident and diffraction angles of the $m^{th}$ order diffraction respectively. Differentiating Eq. 1, we can obtain the angular dispersion $d\theta_{mG}/d\lambda = m_G/(d_G \cdot \cos\theta_{mG})$ of the diffracted beam introduced by the grating. Likewise, the angular dispersion introduced by the DMD is $d\theta_{iD}/d\lambda = m_D/(d_D \cdot \cos\theta_{iD})$, where the subscripts G and D denote the grating and DMD respectively. In the DUBS, the $1^{st}$ order diffraction of the grating ($m_c$) and the $-5^{th}$ order diffraction of the DMD, the lowest available diffraction order, are used. Hence, the ratio of angular dispersion introduced by the grating and the DMD can be expressed as $$\frac{d\theta_{iG}/d\lambda}{d\theta_{mD}/d\lambda} = -\frac{1}{s} \cdot \frac{d_D \cos\theta_{iD}}{d_G \cos\theta_{mG}}. \quad (2)$$

Next we present the optical design procedure. The distance between any optical component A and B is defined as $s_{A-B}$. Accordingly, the angular magnification of L2 can be expressed as $$M_A = -\frac{s_{G-L_2}}{s_{L2} - D}. \quad (3)$$

To remove the angular dispersion, $-M_A$ should be equal to $(d\theta_{iG}/d\lambda)/(d\theta_{mD}/d\lambda)$. As Eq. 2 is negative, a mirror M2, located between L2 and the DMD, is introduced to convert the sign of $M_A$. From Eq. 2 and Eq. 3, which are independent of wavelengths, we can conclude the beam shaping setup is dispersion free. In the experiment, the pixel size of the DMD is $d_D$-10.2 μm; the angles of the incident and diffracted beams of the grating are $\theta_{iG}$-30° and $\theta_{mG}$=27' respectively; the angles of the incident and diffracted beams of the DMD are $\theta_{iD}$=27 and $\theta_{mD}$=-5° respectively. Accordingly, the angular dispersion introduced by the DMD is equivalent to that introduced by a 463 lines/mm grating, considering its $-1^{st}$ diffraction order. Substituting these values into Eq. 2 and Eq. 3 in combination with the Gaussian lens formula, $1/f_{L2} = 1/s_{G-L2} + 1/s_{L2-D}$, we can obtain $s_{G-L2}$=138.6 mm and $s_{L2-D}$. According to the results, in the experiment we set $s_{L1-G}$=11 mm, $s_{G-L2}$=139 mm, $s_{L2-M2}$=240 mm, and $s_{M2-D}$=119 mm. The specific diffraction orders have fixed values in the illustrative specific DMD and optical setup. Using a different DMD may lead to different values of $m_G$ and $m_D$.

Pattern Design and Generation

With angular dispersion being compensated, this section shows how to form proper patterns on the DMD to generate different beam modes. Four beam modes are demonstrated including Airy beam, Laguerre-Gaussian (LG) beam, Bessel beam and a custom-designed "Peace Dove". To begin, let $A(x,y) \cdot \exp[i\varphi(x,y)]$ be the target wavefront, where $A(x,y) \in [0,1]$ and $\varphi(x,y)$ represent the amplitude and phase of the electric field respectively; x and y are the coordinates in Cartesian coordinate system. Next, let $h(i,j) \in \{0,1\}$, $(1 \le i \le m, 1 \le j \le n, i,j \in N)$ be the pixels on the DMD, where 1 and 0 refer to the "on" and "off" states respectively; and m and n refer to the number of rows and columns respectively, i.e., $x = i \cdot d_G$ and $y = j \cdot d_G$. In order to synthesize the wavefront, according to Lee holography, the hologram on the DMD can be generated according to Eq. 4:

$$h(i,j) = \begin{cases} 1, & -\frac{\sin^{-1}A(x,y)}{2\pi} \le \frac{R(x,y)}{T} + \frac{\varphi(x,y)}{2\pi} + k \le \frac{\sin^{-1}A(x,y)}{2\pi}, \\ 0, & \text{otherwise} \end{cases} \quad (4)$$

where $R(x,y)$ is a tilted phase to spatially separate different diffraction orders; T is the grating period and k is an integer. Generally, the tilted phase is given by $R(x,y) = \cos\theta \cdot x + \sin\theta \cdot y$, where $\theta$ is the angle of the fringes measured counter-clockwise from the positive y-axis. For the four selected beam modes, i.e., the Airy beam, Bessel beam, LG beam, and "peace dove" beam, their wavefront formulae are presented in Eq. 5, Eq. 6, Eq. 7, and Eq. 8 respectively. Note that Eq. 6 and Eq. 7. are converted from polar to Cartesian coordinate system for programming the pixels on the DMD.

Airy Beam (Cubic Phase):

$$\varphi_{Airy}(x,y) = 2\pi \cdot \frac{x^3 + x^3}{\rho_o} \quad (5)$$

Bessel Beam (Conical Phase):

$$\varphi_{Bessel}(\rho) = 2\pi \cdot \frac{\rho}{\rho_1} \rightarrow \varphi_{Bessel}(x,y) = 2\pi \cdot \frac{\sqrt{x^2+y^2}}{\rho_1} \quad (6)$$

LG Beam (Helical Phase):

$$\varphi_{LG} = 2\pi \cdot \frac{\phi}{\phi_o} \rightarrow \varphi_{LG}(x,y) = \begin{cases} \frac{2\pi}{\phi_o} \cdot \tan^{-1}\frac{y}{x}, & x \ge 0 \\ \frac{2\pi}{\phi_o} \cdot \left(\tan^{-1}\frac{y}{x} + \pi\right), & x < 0 \end{cases} \quad (7)$$

Figure 6A:
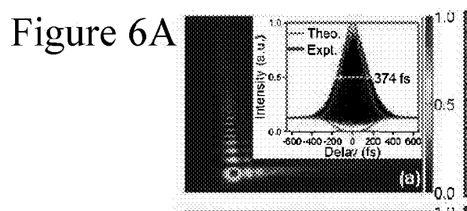
FIG. 6a illustrates the experimental results of the intensity profile of shaped Airy beam.
Figure 6B:
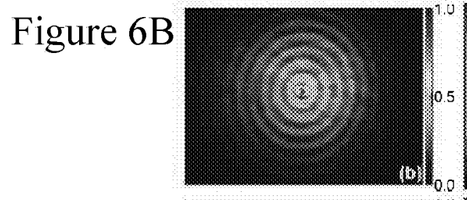
FIG. 6b illustrates the experimental results of the intensity profile of shaped Bessel beam.
Figure 6C:
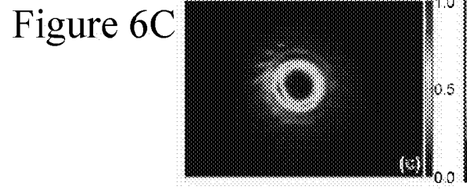
FIG. 6c illustrates the experimental results of the intensity profile of shaped LG beam.
Figure 6D:
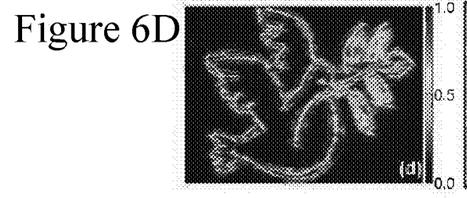
FIG. 6d illustrates the experimental results of the intensity profile of shaped "peace dove" beam.
Figure 6E:
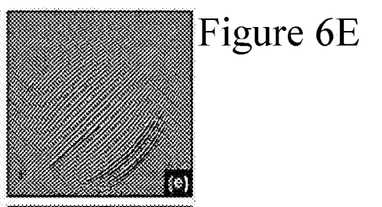
FIG. 6e illustrates the center portion of corresponding binary patterns for the Airy beam mode on the DMD.
Figure 6F:
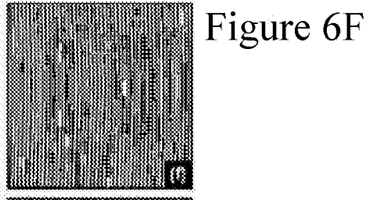
FIG. 6f illustrates the center portion of corresponding binary patterns for the Bessel beam mode on the DMD.
Figure 6G:
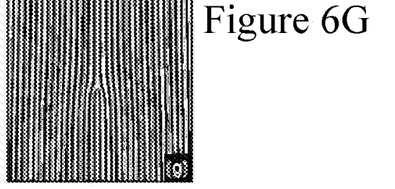
FIG. 6g illustrates the center portion of corresponding binary patterns for the LG beam mode on the DMD.
Figure 6H:
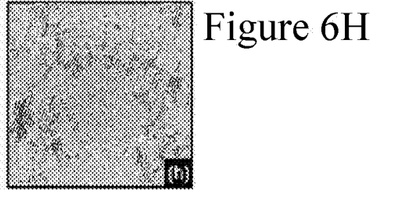
FIG. 6h illustrates the center portion of corresponding binary patterns for the "peace dove" beam mode on the DMD.

Peace Dove Beam (Irregular Phase and Amplitude):

$$\begin{cases} \varphi_{dove}(x,y) = \varphi_{im}(x,y) \\ A_{dove}(x,y) = A_{im}(x,y) \end{cases} \quad (8)$$

where $\rho$ and $\phi$ are the coordinates used in polar coordinate system; $\rho_0$, $\rho_1$ and $\phi_0$ are constants. In the experiment, the grating period of the DMD is set to be 10 pixels, i.e., T=103 μm. Note that for the Airy beam, Bessel beam, and LG beam, only the phases are modulated, according to Eq. 5, 6 and 7. For the "peace dove" beam, both the phase and amplitude are modulated, according to Eq. 8. To spatially separate the $-1$st order beam from others, the tilted phase is defined as $R_{Airy}(x,y) = (x+y)/\sqrt{2}$ for the Airy beam; tilted phase is identical for the LG, Bessel and dove beam, defined as $R_{Bessel}(x,y) = R_{LG}(x,y) = R_{dove}(x,y) = y$. The constant, $1/\sqrt{2}$, indicates that the fringes of the Airy pattern are tilted for 45°. FIG. 6(a)-6(d) present the experimental results of the intensity profiles of shaped Airy beam, Bessel beam, LG beam and "peace dove" beam respectively; FIG. 6(e)-6(h) present the center portion of corresponding binary patterns for each beam mode on the DMD. The inset in FIG. 6(a) presents the autocorrelation curves of the output Airy beam; the small FWHM (374 fs) of the Airy beam curve suggests that varying the patterns on the DMD will not introduce additional angular dispersion. The result confirms that the phase modulation in the DUBS is independent of wavelength variation according to Eq. 4. Accordingly, the DUBS is a dispersion-free arbitrary beam shaper.

High-Speed Z-Scanning for Laser Scanning Microscopy

Figure 2:
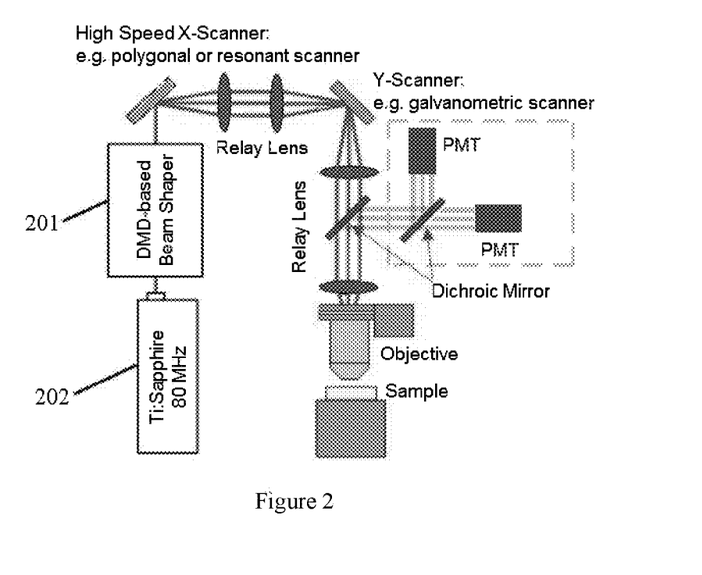
FIG. 2 is an illustrative TPE microscope equipped with a device according to an embodiment of the disclosure.

One critical application of this invention is to scan the focal point of the laser at ultrahigh speed, i.e. the update rate of a DMD (4-32 kHz). As shown in FIG. 2, a laser scanning two-photon excited (TPE) microscope according to the present application can include a DMD-based z-scanning unit by introducing a DMD right after the femtosecond laser to adjust its wavefront. The plane wavefront is then modulated into a spherical wavefront. If the wavefront projected to the scanners is converging, the focal point at the sample will be raised in axial direction. Likewise, the focal point will be lowered when the wavefront is diverging. Note that the DMD can be synchronized with the x and y scanning unit (e.g. polygon mirror, or galvanometric scanner, to realize ultrafast z-scanning. In FIG. 2, the DMD-based z-scanning unit and the laser source 202 commonly constitute a DUBS according to the present application.

The phase of a spherical wavefront is given by $$\phi(x, y) = \frac{\pi(x^2 + y^2)}{\lambda f},$$

where $\lambda$ is the wavelength and f is the focal length of the spherical wavefront. If we change and apply it to Eq. 4, then the DMD-based beam shaper will generate a spherical wavefront with varying focal length accordingly. In this case, the beam shaper functions as a lens with tunable focal length. As a result, the focal point within the sample will move along the axial direction corresponding to the convergence or divergence of the spherical wavefront, at a speed equal to the pattern update rate of the DMD, thereby achieving high-speed z-scanning for TPE microscopy.

High-Speed Random-Access Scanning for Laser Scanning Microscopy

Applying the specific patterns on the DMD, ultrafast speed in-plane (lateral) scanning, i.e., x-axis and y-axis, of the focal point of the pulsed laser can also be achieved via the DUBS. In addition, lateral (x and y) and axial (z) scanning can be combined based on the principle of superposition, realizing ultrafast "random-access scanning"— popular technique in laser scanning microscopy, which conventionally are performed using a piezoelectric actuator or a pair of acousto-optic deflector (AOD) to scan.

Multi-Depth and Omnidirectional Imaging

Figure 3:
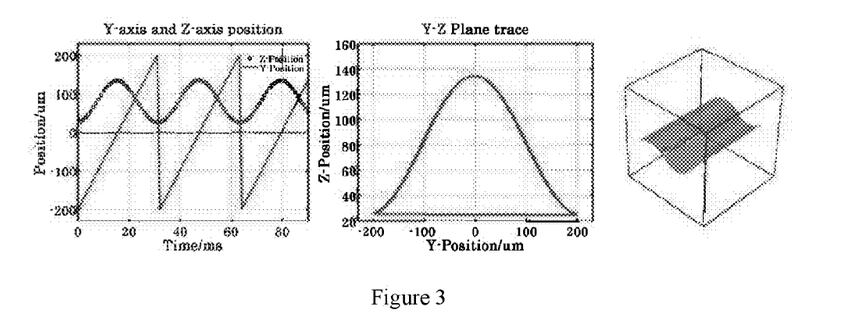
FIG. 3 is an illustrative example of a curved imaging plane achieved by properly synchronizing the motion of y-scanner and the variation of the wavefront focal length of a device according to an embodiment of the disclosure.

Since the update rate of the DMD is compatible with that of the fast x-scanner, i.e. the polygon mirror, real time multi-depth and omnidirectional imaging in 3-dimensional (3-D) space can be realized. Specifically, for omnidirectional imaging, during a raster x-y scan, each pixel can be assigned a specific z position which forms an arbitrary surface. FIG. 3 shows an example of a curved imaging plane achieved by assigning a proper focal length f to the spherical wavefront.

Figure 4:
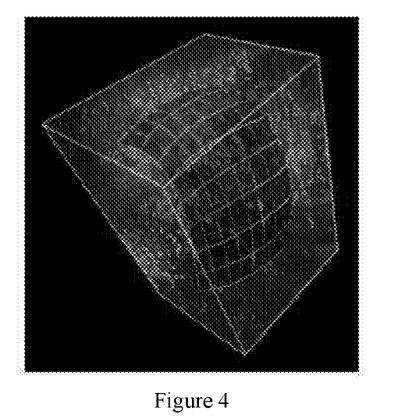
FIG. 4 is an illustrative example of imaging neural network in 3-D by omnidirectional imaging of a device according to an embodiment of the disclosure.

These ultrafast z-scanning enabled techniques, i.e. multi-layer imaging and omnidirectional imaging, are powerful tools for biomedical imaging. For example, omnidirectional imaging can be used to study the neural network activities in real time by conforming imaging plane to follow certain 3-D neural network in space as shown in FIG. 4.

Comparison with Existing Product

Shaping CW laser beam, or monochromatic beam, has been well studied to generate various wavefront such as Bessel beam, Airy beam, and LG beam etc. However, a mature and effective method to shape the beams of a pulsed laser has yet to be developed despite the fact that pulsed lasers have many applications for both industry and academia. In addition, our new technology can also be used to shape CW lasers. Overall, the DUBS is low cost and has significant advantages over conventional beam shaping technologies. The following sessions will compare DUBS with existing beam shaping technologies.

Shaping pulsed laser beam with SLM, especially liquid crystal-based SLM (LCSLM), is one of the most adopted shaping methods and commercially available. This method is effective, robust and dispersion-free. However, it has the following drawbacks compared with to DUBS:

a) The refresh rate of a LCSLM is much lower. An SLM typically runs at a refresh rate of 60 frame-per-second (fps) and the best one runs at 200 fps. On the contrary, a DMD can operate at a refresh rate of 4-32 kHz, which is higher than the SLM by at least an order of amplitude.

b) LCSLM has a limited bandwidth. The bandwidth of an SLM is determined by the transmission characteristics of its liquid crystal (LC) layer, so the bandwidth is usually narrow and extremely difficult to extend to ultraviolet (UV) range. On the other hand, the bandwidth of a DMD is solely dependent on the coating of the micromirrors and can be tuned and extended to UV or infrared at low cost.

c) LCSLM has a lower damage threshold. Generally, an SLM may be damaged in three ways: (1) thermal damage of LC caused by high average power, (2) abrasion damage of the dielectric or aluminum layer caused by high peak power, and (3) photochemical damage caused by illuminating LC molecules with UV light at a wavelength less than 300 nm. For a DMD, it can take much higher average/peak laser power before any damage occurs.

d) LCSLM is expensive. In most cases, an LCSLM costs no less than 10,000 US dollars while a DMD is available at a price of around 500 US dollars or less.

e) LCSLM cannot modulate/shape phase and amplitude simultaneously. A single SLM can only modulate either phase or amplitude at a time unless two are employed simultaneously. However, this setup substantially decreases diffraction efficiency as well as increases the cost. In comparison, a single DMD itself is capable of shaping phase and amplitude simultaneously at low cost.

A DM is a mirror with a deformable surface that is controlled by the force of actuators beneath the surface, mechanically or electrostatically. Experiments have been performed to shape smoothly varying phase with a DM. Nevertheless, several intrinsic limits of the DM confine its usage to a handful of applications while the DMD is more versatile.

a) A DM has limited pixels/actuators (100 s~1000 s pixels). The number of actuators determines the sampling rate and resolution in constructing an arbitrary wavefront. Unfortunately, this number is typically less than a few hundreds, so it is not practically to precisely shape a fast changing wavefront with the DM. In contrast, the number of pixels of a DMD usually is at the level of a million or higher, e.g. 1280*800, so the DMD can shape extremely distorted wavefront with a high resolution.

b) A DM is more expensive (10 k to 100 k USD). The DMD is much cheaper than a DM as DMD is a matured device.

c) A DM-based pulse shaper cannot effectively compensate dispersion when the pulse duration/width is long. The DM works well when shaping a laser beam with short pulse width. However, when the pulse width is stretched longer, e.g. 200 femtoseconds (fs), significant dispersion will occur. For the DUBS, a dispersion compensation unit is included in the system which is not sensitive to pulse width, and thus no additional dispersion will be introduced to the beam shaping process.

According to the above, the DUBS is a low-cost, high-speed, highly efficient, and robust pulse shaping device, which can be widely used in industrial applications and scientific research. The DUPS provides precision control over the wavefront of a pulsed laser beam at ultrafast speed (32 kHz) that no over existing pulse shaping technologies can achieve.

Application examples of the DUPS include but not limited to the following cases:

a) Axial scanning (z-scanning) as well as lateral scanning (x- or y-scanning) by generating spherical wavefronts (with different radii) and tilted phases respectively. Take z-scanning as an example, the dynamic binary mask can be viewed as a lens with tunable focal length. Changing the radius of a spherical wavefront causes the laser beam to converge or diverge, which subsequently controls focal length. Since high-speed axial scanning is a long-sought goal in both biomedical imaging and manufacturing, e.g. 3D printing, this technique may generate significant impact in these two fields. Combining the x, y, and z scanning, random-access scanning can be achieved.

b) Simultaneous omnidirectional imaging and optical stimulation can be achieved by including an "optical switch", e.g. acoustic-optic modulator (AOM), on the basis of 4(a). An AOM is a device that can deflect incident beam to different orientations thereby controlling the "ON/OFF" state of the beam. As a result, combining axial scanning and optical switching together will enable three-dimensional simultaneous imaging and stimulation. This technique will have a profound impact on biological studies and clinical applications, such as the study of neural networks, optogenetics and neuronal degeneration diagnose etc.

c) Generating various typical or arbitrary beam profiles. The DUBS can shape a pulse laser beam into Bessel beam, Airy beam, LG beam and any other types of profiles. Particularly, Bessel beam and Airy beam will not diffract when they propagate, often referred as "light bullet", so they are very promising to increase the penetration depth in microscopy. Besides, Bessel, Airy and LG beam are proved useful in optical tweezer, molecule manipulation, and extending field-of-view (FOV) or achieving super-resolution in microscopy etc. These beam profile can also be combined with axial scanning shown in 4(a). For instance, when LG beam is combined with axial scanning shown in 4(a), a microscope that can rapidly scan in the axial direction beyond the diffraction limit would be possible. Furthermore, even an arbitrary image can be reconstructed with a pulsed laser in our invention, which can find use in the fields of holography and laser art.

d) Wavefront correction. Wavefront correction is often used in "Adaptive Optics" (AO). Conventional AO utilized a DM as the key correction component. This technique is indispensable to astronomical telescopes, laser communication systems and microscopy etc. Using the DUBS, an incoming distorted wavefront can be detected and corrected. Our invention is superior to DM-based AO with higher resolution and lower cost.

Preliminary experimental data show that the DUBS can completely compensate dispersion and shape a pulsed laser beam to any desired wavefront with a high resolution. Next, we will first present measured autocorrelation curves (FIG. 5) (FIGS. 5a-5d) to prove the effectiveness of dispersion compensation, and lastly present the various beam profiles (FIGS. 6a-6h) shaped by the DUBS.

Figure 5A:
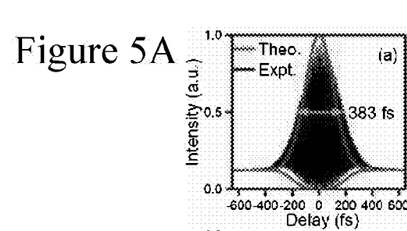
FIG. 5a illustrates theoretical and experimental autocorrelation curves of the input beam before the grating according to an embodiment of the disclosure.
Figure 5B:
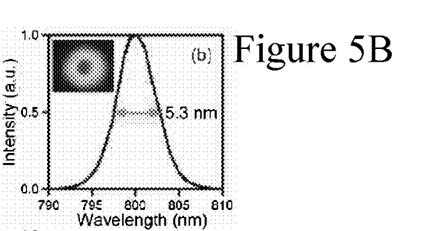
FIG. 5b illustrates spectrum of the input beam and intensity distribution of the input beam according to an embodiment of the disclosure.
Figure 5C:
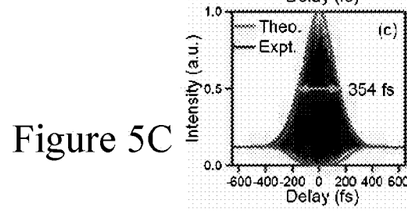
FIG. 5c illustrates theoretical and experimental autocorrelation curves of the output beam departing from the DMD at −1st diffraction order of the hologram according to an embodiment of the disclosure.
Figure 5D:
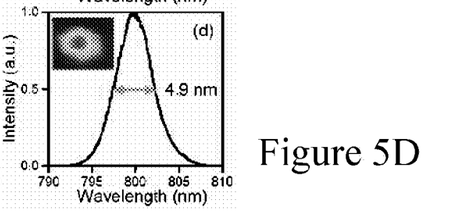
FIG. 5d illustrates spectrum of the output beam and intensity distribution of the output beam according to an embodiment of the disclosure.

To assess the effectiveness of dispersion compensation, we measured the pulse width of the laser beam before the grating and after the DMD using an autocorrelator (e.g. PulseCheck USB 50, APE, Germany). As shown in FIG. 5(a)-(b), the autocorrelation curves of the beam before the grating and those after the DMD have a full width at half maximum (FWHM) close to the other. The comparison confirms that dispersion compensation is effective. In addition, the FWHM of the curve after the DMD is slightly smaller than the one before the grating by ~30 fs. This indicates that the dispersion compensation is also capable of removing dispersion caused by other sources, such as the intrinsic chirp of the laser source or misalignment.

In particular, FIG. 5 (a) illustrates theoretical (red) and experimental (black) autocorrelation curves of the input beam before the grating. FIG. 5 (b) illustrates spectrum of the input beam; Inset: Intensity distribution of the input beam. FIG. 5 (c) illustrates theoretical (red) and experimental (black) autocorrelation curves of the output beam departing from the DMD at −1st diffraction order of the hologram. FIG. 5 (d) illustrates spectrum of the output beam; Inset: Intensity distribution of the output beam.

FIGS. 6a-6h present the results of the beam shaping experiments (theories have been presented in Section 2). In the experiment, the grating period of the DMD was set to be $T=10d_D=100.8$. To spatially separate the −1st order from others, the tilted phase is $R(x,y)=(x+y)/\sqrt{2}$ for Airy beam while those for LG, Bessel and "Peace Dove" beam are $R(x,y)=y$. FIGS. 6 (a)-(d) show the intensity distribution of the beam modes; FIG. 6 (e)-(h) show the center portion of corresponding binary patterns on the DMD. The FWHM of the autocorrelation curve (inset of FIG. 6(a)) is 374 fs, which suggests that changing patterns on the DMD does not interfere with dispersion compensation.

In particular, FIGS. 6(a)-(d) illustrate intensity distribution of different beam modes and their corresponding patterns on the DMD, i.e., intensity distribution of Airy beam, Bessel beam, LG beam and "Peace Dove" beam respectively; FIGS. 6(e)-(h) illustrate patterns on the DMD that generate Airy beam, Bessel beam, LG beam and "Peace Dove" beam respectively. Inset in (a) illustrates experimental (black) and theoretical (red) autocorrelation curves of the beam shaped in Airy mode.

Figure 7A:
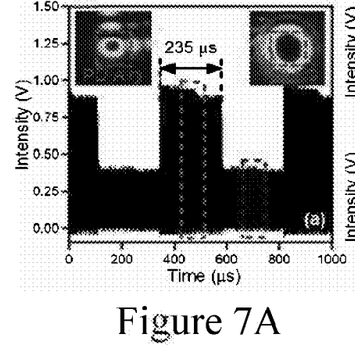
FIG. 7a illustrates intensity variations recorded by the PD when switching between Airy beam and LG beam.
Figure 7B:
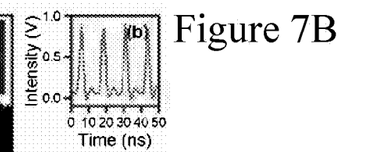
Figure 7C:
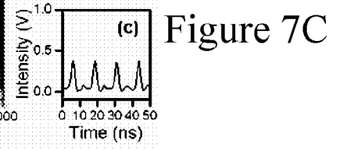

To validate the ultrafast shaping rate of DUBS, we replaced the CCD camera in FIG. 1 with a photodiode (DET10A—Si Detector, Thorlabs, USA). In this setup, the beam was shaped alternatively between Airy mode and LG mode at the maximal pattern rate (4.2 kHz) of the DMD (DLP4500-NIR, Texas Instrument, USA). The photodiode (PD) was placed at the head position of the Airy beam pattern, bottom left corner in FIG. 6(a), as well as the "doughnut" center of the LG beam, as shown in FIG. 7(a). Since, where the PD located, the Airy pattern contains more energy than the "hollow" LG pattern, the output of the PD fluctuated between a "high" and "low" value; the duration of which (235 μs) implies the shaping rate of DUBS is at 4.2 kHz. When zooming in at the "high" and "low" regions, individual pulses of 80 MHz repetition rate can also be observed at the Airy or LG mode; the results are shown in FIG. 7(b)-(c). Moreover, the shaping rate of DUBS can be further increased using a DMD of higher update rate, e.g. DLP7000 (Texas Instruments, USA) with a pattern rate of 32.5 kHz.

FIG. 7 (a) illustrates intensity variations recorded by the PD when switching between Airy beam (higher intensity) and LG beam (lower intensity). FIG. 7 (b) illustrates Intensity variation of pulses in Airy mode when zooming in on the red dashed region located in FIG. 7(a). FIG. 7 (c) illustrates intensity variation of pulses in LG mode when zooming in on the blue dashed region located in FIG. 7(a). Insets in (a) is illustrations of locations of the PD (dashed square) relative to Airy beam (left) and LG beam (right).

We claim:

1. A device for shaping and scanning a pulsed laser beam containing a different frequency spectrum, comprising:
    a digital micromirror device (DMD) consisting of a plurality of micromirrors, configured to receive the laser beam and shape the received laser beam with a binary hologram, wherein the DMD simultaneously functions as a programmable binary mask and a blazed grating;
    a dispersion compensation unit, arranged before or after the DMD, including a blazed grating configured to disperse a spectrum of the laser beam so as to transfer the laser beam from the laser source to the DMD with a designated angular dispersion for neutralizing the angular dispersion introduced by the DMD; and
    a lens pair comprising a first lens L1 and a second lens L2, configured to collimate and expand the pulsed laser beam and image the beam onto the DMD, wherein the second lens L2 has a focal length $f_{L2}$ and is arranged between the DMD and the blazed grating, wherein a distance $S_{G\text{-}L2}$ between the blazed grating and the lens L2 and a distance $S_{L2\text{-}D}$ between the lens L2 and the DMD satisfy the following equation set:

$$\begin{cases} \dfrac{s_{G-L2}}{s_{L2-D}} = \left| \dfrac{m_G}{m_D} \cdot \dfrac{d_0 \cos\theta_{i\theta}}{d_0 \cos\theta_{m\theta}} \right| \\ \dfrac{1}{f_{L2}} = \dfrac{1}{s_{G-L2}} + \dfrac{1}{s_{L2-D}} \end{cases}$$

wherein m is an integer indicating a diffraction order, d is a grating period, $\theta_i$ and $\theta_m$ are incident and diffraction angles of a $m^{th}$ order diffraction, respectively, and G and D are the blazed grating and the DMD, respectively.

2. The device of claim 1, wherein the dispersion compensation unit further comprises a mirror configured to change the sign of angular dispersion of the beam imaged to the DMD.

3. The device of claim 1, further comprising an imaging unit, configured to record and/or monitor beam modes obtained from the output beam of the DMD.

4. The device of claim 3, wherein the imaging unit comprises:
    a filter, configured to filter the output beam from the DMD; and
    a CCD camera, configured to record and/or monitor laser beam modes obtained from the filtered beam.

5. The device of claim 1, wherein the micromirrors of the DMD are programmable to generate variable patterns to shape beams into arbitrary profiles.

6. The device of claim 1, wherein the dispersion compensation unit is arranged so that the designated angular dispersion is positive if the angular dispersion introduced by the DMD is negative and the designated angular dispersion is negative if the angular dispersion introduced by the DMD is positive.

7. A laser scanning microscope comprising the device of claim 3.

8. The microscope according to claim 7, wherein the device is used in the microscope for controlling pulsed laser beam modes and z-scanning.

9. The microscope according to claim 7, wherein the microscope is configured to control the beam modes and x-, y- and z-scanning, realizing random-access scanning.

10. The microscope according to claim 7, wherein the microscope is a wide field, point-scanning, or line-scanning microscope based on pulsed lasers.

11. The microscope according to claim 7, wherein the microscope is a super-resolution microscope based on pulsed lasers.

* * * * *